United States Patent
Benjey

(10) Patent No.: US 7,882,823 B2
(45) Date of Patent: Feb. 8, 2011

(54) DOUBLE SHUT-OFF REFUELING VALVE

(75) Inventor: Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 531 days.

(21) Appl. No.: 11/706,047

(22) Filed: Feb. 13, 2007

(65) Prior Publication Data

US 2007/0193561 A1 Aug. 23, 2007

Related U.S. Application Data

(60) Provisional application No. 60/772,722, filed on Feb. 13, 2006, provisional application No. 60/851,159, filed on Oct. 12, 2006.

(51) Int. Cl.
*F02M 33/02* (2006.01)
*B60K 15/035* (2006.01)
*F16K 24/02* (2006.01)
*F16K 31/18* (2006.01)

(52) U.S. Cl. .......................... 123/518; 137/43; 137/202; 137/433

(58) Field of Classification Search ................. 123/518; 137/43, 202, 583–589, 433; 251/328
See application file for complete search history.

(56) References Cited

U.S. PATENT DOCUMENTS

| | | | | | |
|---|---|---|---|---|---|
| 1,890,126 | A | * | 12/1932 | Moore | 137/435 |
| 3,230,965 | A | * | 1/1966 | Richards | 137/202 |
| 4,186,772 | A | * | 2/1980 | Handleman | 137/891 |
| 5,054,528 | A | * | 10/1991 | Saitoh | 141/59 |
| 5,215,132 | A | * | 6/1993 | Kobayashi | 141/302 |
| 5,282,497 | A | * | 2/1994 | Allison | 141/59 |
| 5,535,772 | A | * | 7/1996 | Roetker et al. | 137/43 |
| 5,950,655 | A | * | 9/1999 | Benjey | 137/43 |
| 6,029,635 | A | * | 2/2000 | Sekine et al. | 123/516 |
| 6,371,152 | B1 | * | 4/2002 | Benjey | 137/202 |
| 6,564,822 | B2 | * | 5/2003 | Muto et al. | 137/202 |
| 6,637,778 | B2 | * | 10/2003 | Benjey | 285/209 |
| 6,675,779 | B2 | * | 1/2004 | King et al. | 123/519 |
| 7,520,293 | B2 | * | 4/2009 | Hilderley et al. | 137/202 |
| 2006/0235989 | A1 | * | 10/2006 | Allman et al. | 709/232 |
| 2007/0204920 | A1 | * | 9/2007 | Handy et al. | 137/588 |
| 2007/0289633 | A1 | * | 12/2007 | Benjey | 137/202 |
| 2009/0078042 | A1 | * | 3/2009 | Haynes | 73/232 |
| 2010/0224262 | A1 | * | 9/2010 | Arnalsteen et al. | 137/43 |

* cited by examiner

*Primary Examiner*—Stephen K Cronin
*Assistant Examiner*—David Hamaoui
(74) *Attorney, Agent, or Firm*—Dykema Gossett PLLC

(57) ABSTRACT

A double shut-off refueling valve responds to a full fuel tank level by closing the recirculation line and the canister line. The valve includes at least one float having one or more sealing surfaces corresponding with the recirculation line and the canister line, respectively. The sealing surface is on the top of a float in the float valve. When the fuel in the tank reaches a full level, the float moves upward to close the recirculation line and the canister line substantially simultaneously. In one embodiment, the valve is a float valve having a coaxial seal where the two valve openings corresponding to the recirculation line and the canister line are arranged concentrically. In other embodiments, the sealing surfaces can be, for example, a ribbon seal, two separate sealing surfaces, or any other seal configuration that corresponds with the orientation of the recirculation line and the canister line within the fuel system.

12 Claims, 5 Drawing Sheets

DOUBLE SHUT-OFF REFUELING VALVE

REFERENCE TO RELATED APPLICATIONS

This application claims the benefit of U.S. Provisional Application 60/772,722, filed on Feb. 13, 2006, and U.S. Provisional Application 60/851,159, filed Oct. 12, 2006, the disclosures of which are incorporated herein by reference.

TECHNICAL FIELD

The present invention relates to shutoff valves for vehicle fuel systems, and more particularly to a valve designed to shut off more than one vapor path in the fuel system.

BACKGROUND OF THE INVENTION

Vehicle fuel systems include a mechanism that detects when the fuel in the tank reaches a full level. The mechanism then shuts off the fuel nozzle to prevent additional fuel from entering the tank and maintain pressure within the tank at or below a desired level. Part of the mechanism includes a recirculation line that is either connected to a vent line between the fuel tank and a vapor storage canister via a T-connection or directly into the fuel tank. When connected to the fuel tank, this recirculation line (also known as a "dip tube") is closed via liquid or a liquid sensitive valve when the fuel tank is at a full level. The fuel system typically uses a canister that captures fuel vapor to prevent the vapor from being released into the atmosphere. Vapor flows through a tube forming a canister line, which should also be closed when the fuel is at a full level. Ideally, the recirculation line and the canister line are closed at the same time when the fuel tank reaches a full level to prevent liquid fuel from carrying over between the two lines and to prevent liquid from entering either line.

SUMMARY OF THE INVENTION

To protect both the recirculation line and the canister line from liquid carry over, the invention is generally directed to a double shut-off refueling valve that responds to a full fuel tank level by closing the recirculation line and the canister line simultaneously. The valve includes at least one float having one or more sealing surfaces corresponding with the recirculation line and the canister line, respectively. The sealing surface is on the top of a float in the float valve. When the fuel in the tank reaches a full level, the float moves upward to close the recirculation line and canister line simultaneously.

In one embodiment, the valve is a float valve having a coaxial seal where the two valve openings corresponding to the dip tube and the vapor vent path are arranged concentrically. In other embodiments, the sealing surfaces can be, for example, two separate sealing surfaces, or any other seal configuration that corresponds with the orientation of the dip tube and the vapor vent path within the fuel system.

DETAILED DESCRIPTION OF THE EMBODIMENTS

Figure 1:
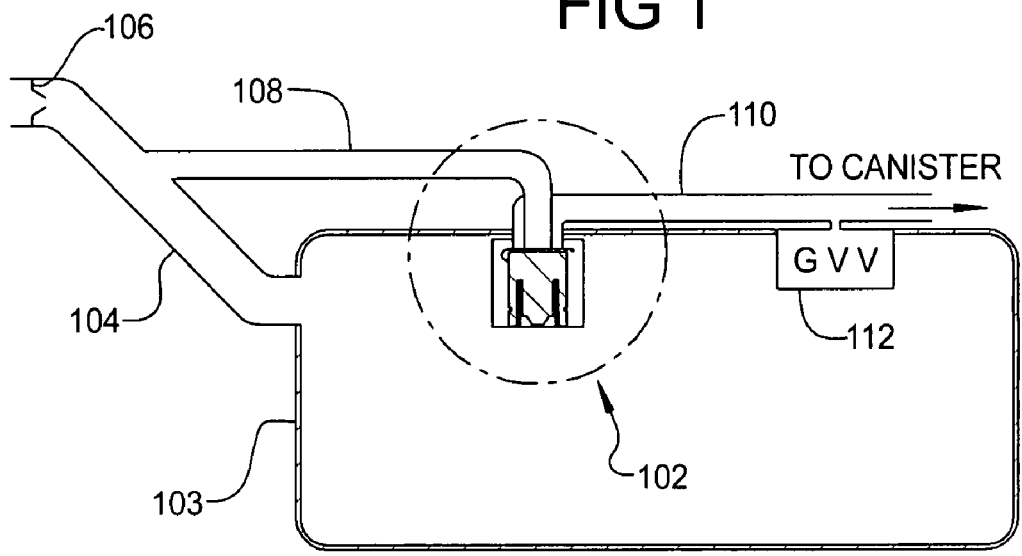
FIG. 1 is a representative schematic diagram of a fuel system including an inventive double shutoff refueling valve.

FIG. 1 is a representative schematic diagram of a fuel system 100 that incorporates an inventive fuel limit vent valve (FLVV) 102, which acts as a double shutoff refueling valve. The system 100 includes a fuel tank 103 and a filler tube 104 having a seal 106 designed to seal around a fuel nozzle (not shown). A recirculation line 108 connects the tank 103 to the filler tube 104 to recirculate fuel vapor from the tank 103, while a canister line 110 connects the tank 103 to a canister (not shown) that stores excess fuel vapor. The ends of the recirculation line 108 and the canister line 110 open into the tank 103, and the FLVV 102 is disposed so that it close both lines at the same time to prevent liquid fuel from carrying over from one line to the other. Closing the FLVV 102 creates a vacuum to build up in the recirculation line 108 to induce fuel nozzle shut-off. It will cause the fuel vapor pressure in the tank 103 to build up, which allows for a pressure driven fuel shutoff if the mechanical seal leaks or when used with traditional fuel systems without a mechanical seal architecture. The system 100 may also include a vent valve 112 connected to the canister line 110, but this valve 112 is not part of the invention.

FIGS. 1 through 5 show a system 100 configuration where the recirculation line 108 and the canister line 110 are disposed concentrically. Although the Figures show the canister line 110 disposed outside the recirculation line 108, the recirculation line 108 can be disposed outside the canister line 110 and the FLVV 102 adapted to close the lines 108,110 without departing from the scope of the invention. Note that the recirculation line 108 and the canister line 110 may also be disposed next to each other (e.g., as shown in FIG. 6) and the FLVV 102 adapted to close these lines without departing from the scope of the invention.

Figure 2:
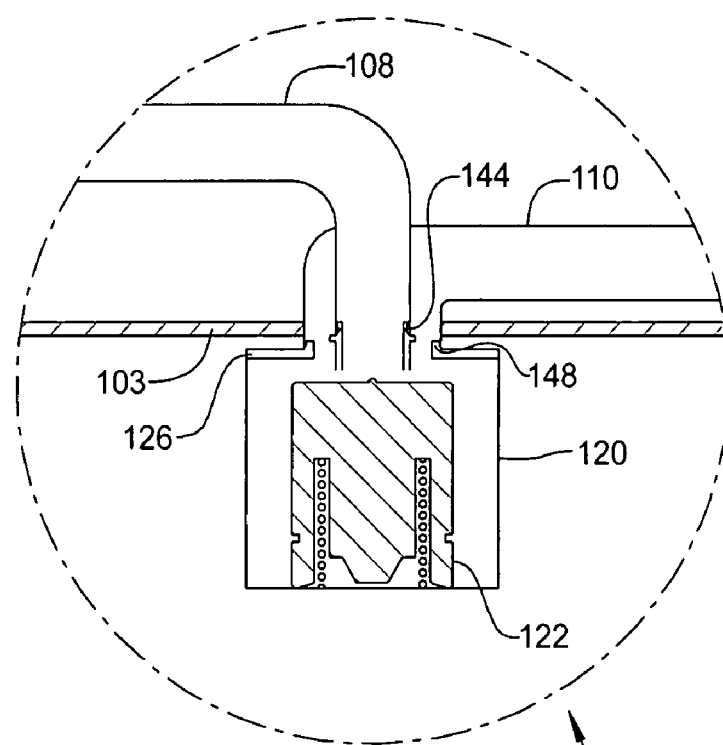
FIG. 2 is a representative schematic section view of a double shutoff refueling valve within the system in FIG. 1 according to one embodiment of the invention.
Figure 3:
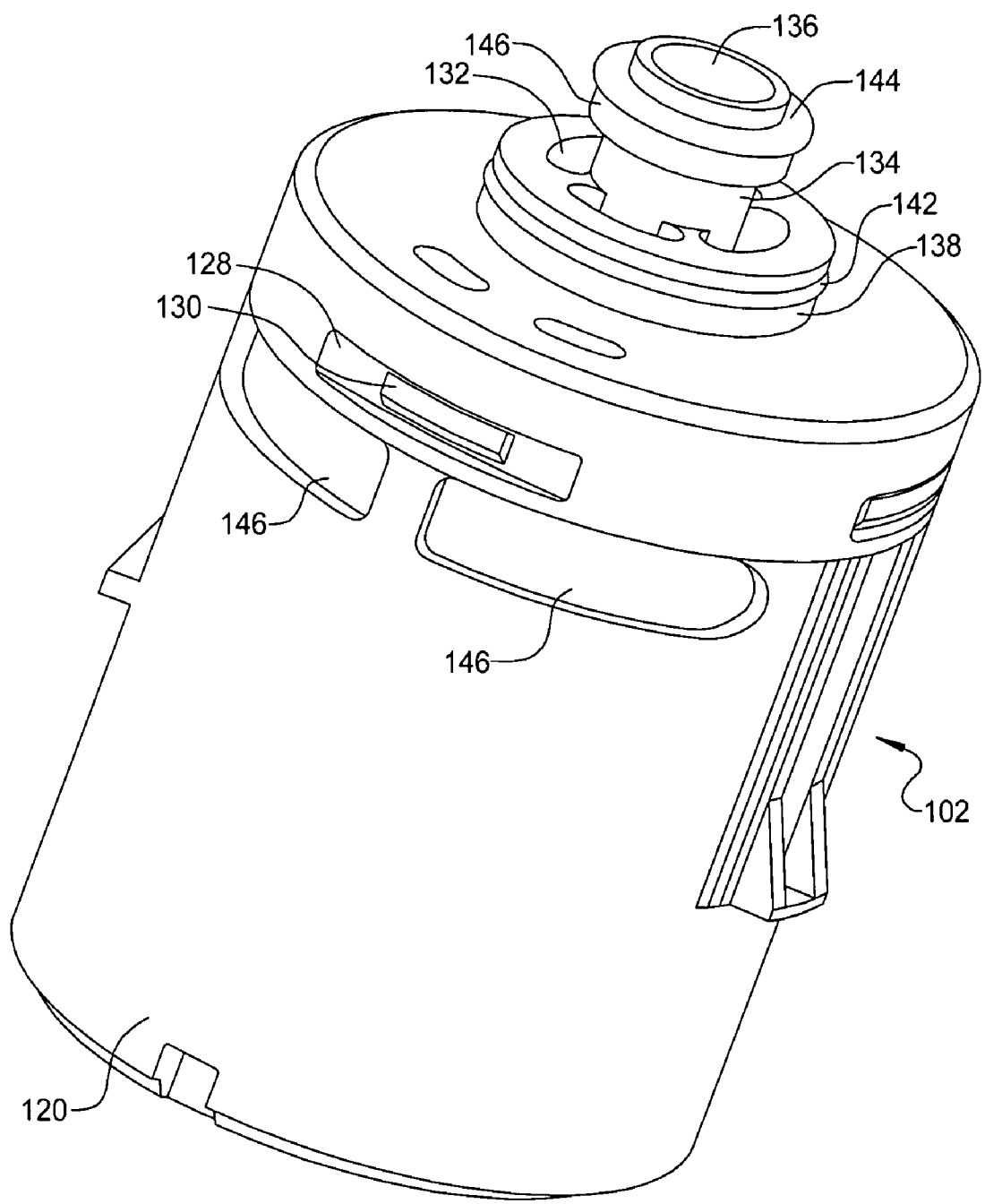
FIG. 3 is a perspective view of a double shutoff refueling valve in FIG. 2.
Figure 4:
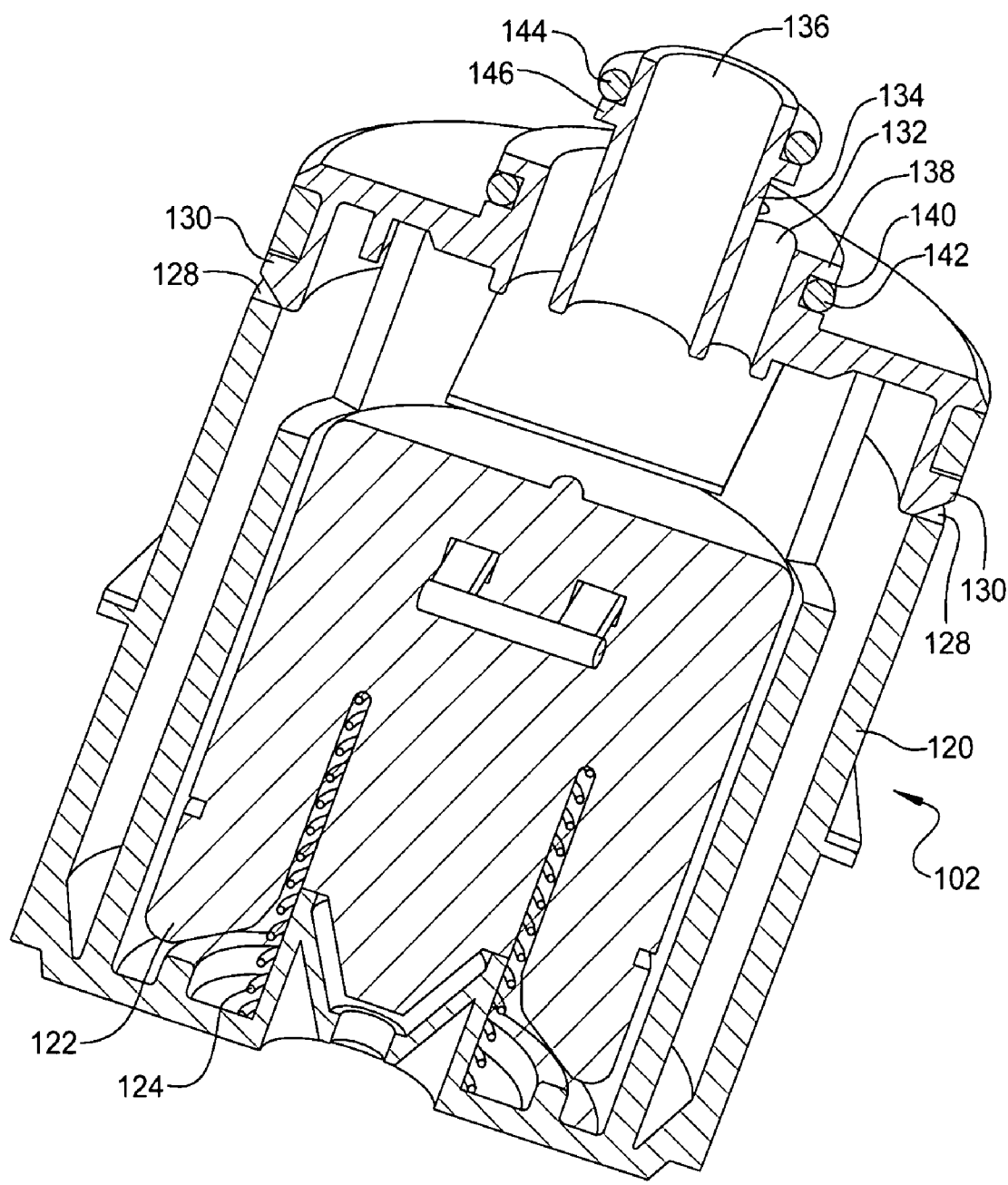
FIG. 4 is a section view of the valve in FIG. 3 taken along the line 4-4.

FIGS. 2 through 4 show a FLVV 102 according to one embodiment of the invention. In this embodiment, the FLVV 102 has a coaxial seal configuration. The FLVV 102 includes a cylindrical housing 120 that surrounds a float 122, which is biased by a resilient member 124 (e.g., a spring). A lid 126 acts as a top closure for the housing 120. In one embodiment, the housing 120 has a plurality of slots 128 that engage with a plurality of tabs 130 formed around the lid 126. Other methods may also be used to attach the lid to the housing.

In this embodiment, the lid 126 has one or more first openings 132 that surround a tube 134 having a second opening 136, forming a co-axial arrangement. The first openings 132 are formed in a first ring 138 that is raised from the top plane of the lid. The first ring 138 contains a first groove 140 that holds a first seal 142, such as an O-ring seal. The tube 134 extends beyond the first ring 138 and has a second seal 144, such as an O-ring seal, that surrounds the second opening 136. A lip 146 may be formed on the tube 134 to support the second seal 144. The inside of the FLVV 102 in this embodiment can be any known float valve configuration.

As shown in FIG. 2, the co-axial configuration of the first seal 142 and the second seal 144 corresponds with the concentric configuration of the recirculation line 108 and the canister line 110. In this embodiment, the recirculation line 108 end is higher than the canister line 110 end. The tube 134 on the FLVV 102 extends into the recirculation line 108 such that the first seal 142 seals against the inner wall of the recirculation line 108. The end of the recirculation line 108 may rest against the lip 146 when the FLVV 102 is properly positioned. The second seal 144 seals against the inner wall of the canister line 110, which surrounds the recirculation line 108 concentrically. The end of the canister line 110 may rest against a top surface of the lid 126 when the FLVV 102 is properly positioned.

When the fuel level in the fuel tank 103 is below the full level, the float 122 stays in the lower portion of the housing 120, leaving the recirculation line 108 and the canister line 110 open. Fuel vapor is therefore allowed to flow freely between the tank 103 and the recirculation line 108 and canister line 110 through side openings 146 in the housing 120. When the fuel level in the tank 103 reaches a full level, liquid fuel flows through the side openings 146 into the housing 120, causing the float 122 to rise and close the first and second openings 132, 136 in the lid 126, thereby closing the recirculation line 108 and the canister line 110 at the same time. This dual shutoff functionality allows quick, simultaneous shutoff of both lines 108, 110, minimizing tank pressure buildup and liquid fuel carryover between lines.

Figure 5:
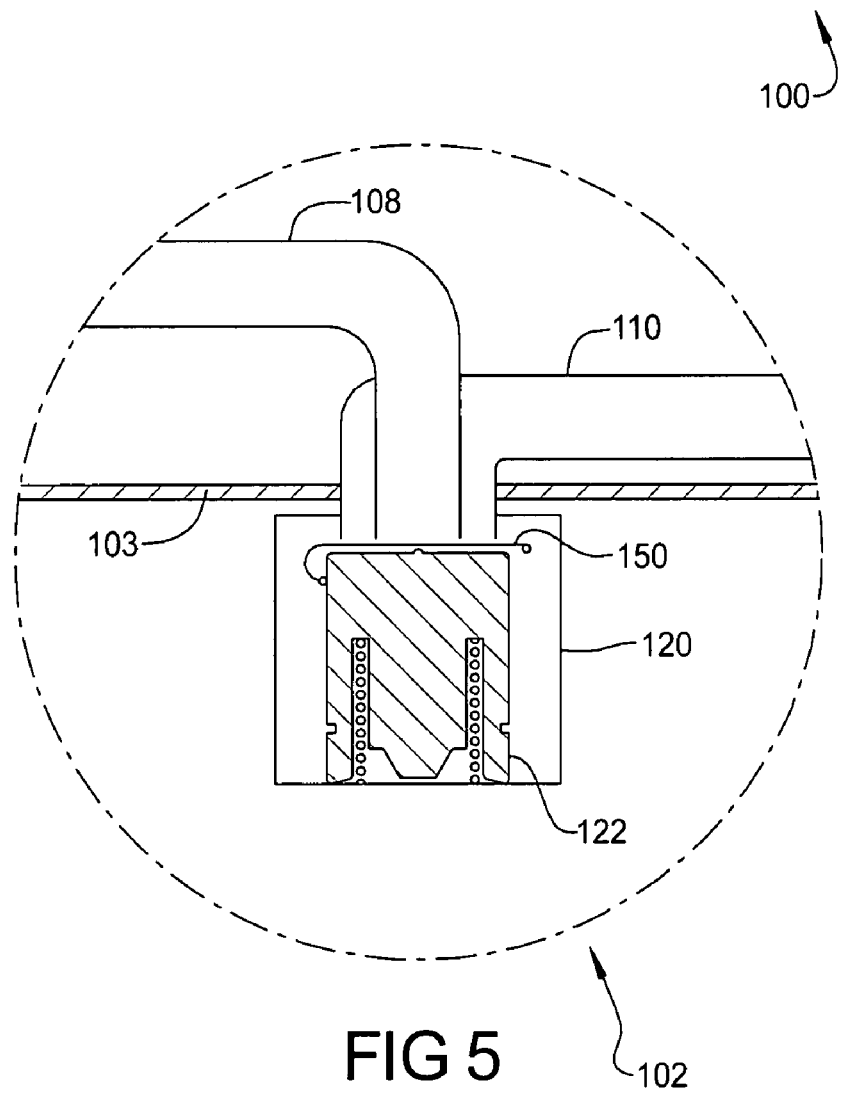
FIG. 5 is a representative schematic section view of a double shutoff refueling valve according to another embodiment of the invention.
Figure 6:
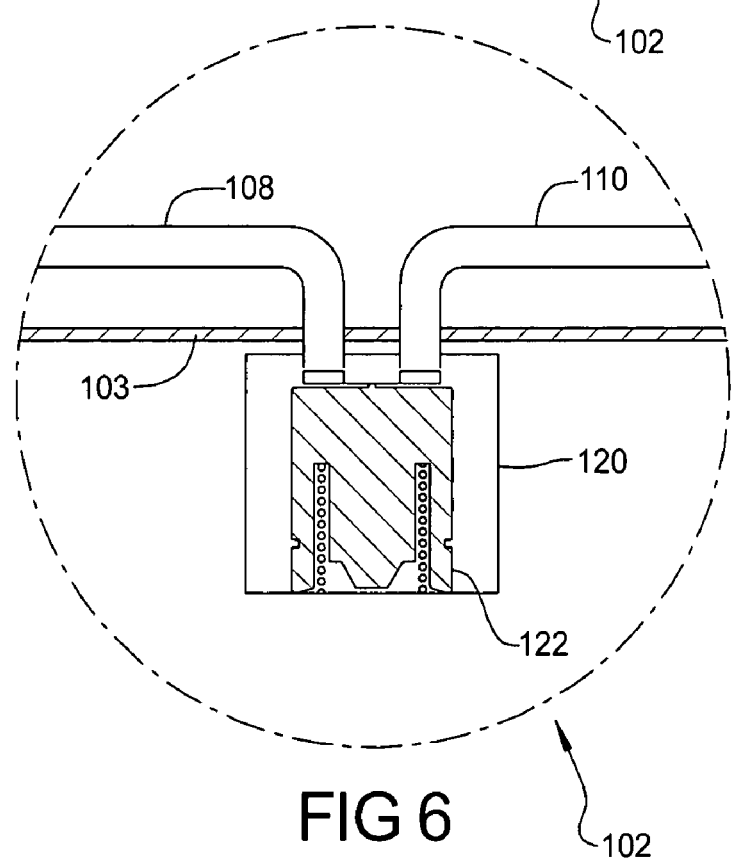
FIG. 6 is a representative schematic section view of a double shutoff refueling valve according to yet another embodiment of the invention.

FIG. 5 shows a FLVV 102 according to another embodiment of the invention. In this embodiment, the float 122 has a ribbon valve 150 attached to its top surface. The ribbon valve 150 uses the flexibility of the ribbon to seal both openings 132, 134 at the same time without the need for extra parts or features to accommodate two distinct sealing surfaces. Since the ribbon is flexible and the sealing surfaces hard and fixed, the preferred embodiment has the sealing surface associated with the first (outer) opening 132 slightly longer (i.e., closer to the ribbon/float) than the sealing surface associated with the second (center) opening 134. This ensures that the main liquid seal prevents fuel from escaping from the fuel tank into either of the lines.

Figure 7:
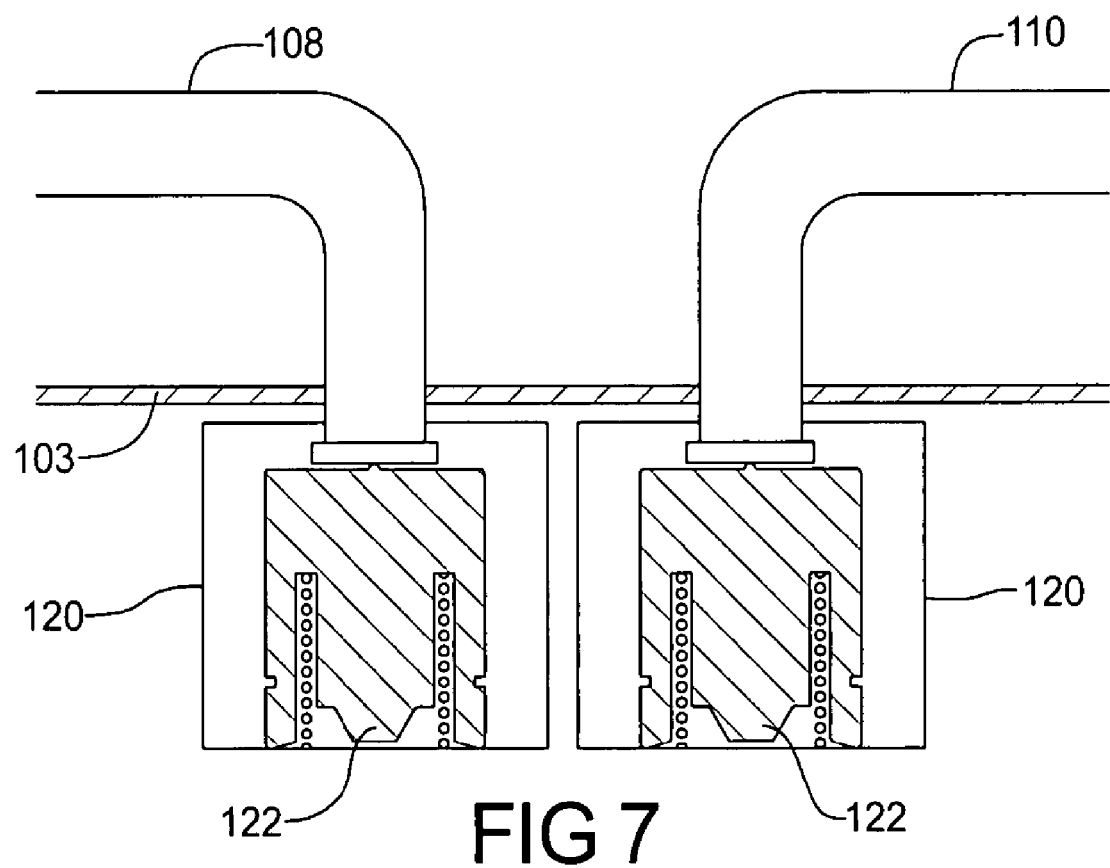
FIG. 7 is a representative schematic section view of a double shutoff refueling valve according to a further embodiment of the invention.

FIGS. 6 and 7 show embodiments of the invention where the recirculation line 108 and the canister line 110 are disposed next to each other rather than concentrically. FIG. 6 shows a FLVV 102 having a tiltable seal mechanism 152 with two line seals 154 aligned with the recirculation line 108 and the canister line 110. The slight tilting action of the seal mechanism 152 compensates for any slight variations in the positions of the lines 108, 110 so that they can be securely closed by the seals 154 simultaneously when the float 122 rises. FIG. 7 shows a configuration having two float valves 160, each containing a float 122 inside a housing 120. The float valves 160 are arranged in the tank 103 so that the floats 122 close their respective lines 108, 110 at the same time. Although FIG. 7 shows two separate housings, each holding one float, the two floats may be enclosed within a single housing as well.

By incorporating a valve configuration that closes a recirculation line and a canister line simultaneously, the inventive fuel system ensures quick nozzle shutoff when the fuel in the tank reaches a predetermined fill level. The fast closing action minimizes tank pressure build up, and the simultaneous closure of the two lines prevents liquid carry over between lines.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vent valve comprising:
   a housing having a top portion with a first opening and a second opening; wherein the first opening and the second opening are arranged concentrically along a vertical axis and wherein the top portion includes a first tube extending from a plane of the top portion and having the first opening and a second tube extending beyond the first tube and having the second opening;
   a float mechanism disposed within the housing, wherein the float mechanism has a seal mechanism disposed on a top surface, and
   a first seal surrounding the first opening and a second seal surrounding the second opening,
   wherein the float mechanism is arranged to move vertically so that the seal mechanism closes the first and second openings substantially simultaneously.

2. The valve of claim 1, wherein the seal mechanism comprises a flexible ribbon seal capable of sealing both first and second openings.

3. The valve of claim 1, wherein the top portion of the housing is a lid.

4. A vent valve comprising:
   a housing having a top portion with a first opening and a second opening;
   wherein the first opening and the second opening are arranged concentrically along a vertical axis and wherein the top portion includes a first tube extending from a plane of the top portion and having the first opening and a second tube extending beyond the first tube and having the second opening;
   a float mechanism disposed within the housing, wherein the float mechanism has a seal mechanism disposed on a top surface,
   wherein the float mechanism is arranged to move vertically so that the seal mechanism closes the first and second openings substantially simultaneously, and
   wherein the first opening includes a plurality of first openings disposed around the second opening;
   further comprising:
      a first tube extending from a plane of a top portion of the housing and having the plurality of first openings,
      a first seal surrounding the plurality of first openings,
      a second tube extending beyond the first tube and having the second opening, and
      a second seal surrounding the second opening.

5. The valve of claim 4, wherein the first tube has a groove that holds the first seal and the second tube has a lip that supports the second seal.

6. A vehicle fuel system, comprising:
   a fuel tank;
   a filler tube connected to the fuel tank;
   a recirculation line connected between the filler tube and the fuel tank, wherein the recirculation line opens into the tank via a first opening;
   a canister line connected to the fuel tank for directing vapor to and from a canister, wherein the recirculation line and the canister line are arranged concentrically; and
   a vent valve positioned in the fuel tank, the valve having
   a housing having a top portion with a first opening corresponding to the recirculation line and a second opening corresponding to the canister line, wherein the first opening and the second opening in the top portion of the housing are arranged concentrically to correspond with the recirculation line and the canister line, and a float mechanism disposed within the housing, wherein the float mechanism has a seal mechanism disposed on a top surface, wherein the float mechanism is arranged so that the seal mechanism closes the first and second openings substantially simultaneously when a fill level in the fuel tank reaches a predetermined level.

7. The system of claim 6, wherein the top portion of the housing further comprises a first tube extending from a plane of the lid and having the first opening, and a second tube extending beyond the first tube and having the second opening.

8. The system of claim 6, wherein the valve further comprises a first seal surrounding the first opening and a second seal surrounding the second opening.

9. The system of claim 6, wherein the first opening includes a plurality of first openings disposed around the second opening.

10. The system of claim 9, wherein the top portion of the valve further comprises: a first tube extending from a plane of the lid and having the plurality of first openings, a first seal surrounding the plurality of first openings, a second tube extending beyond the first tube and having the second opening, and a second seal surrounding the second opening.

11. The system of claim 10, wherein the first ring has a groove that holds the first seal and the second ring has a lip that supports the second seal.

12. The system of claim 6, further comprising a mechanical nozzle seal disposed in the filler tube.

* * * * *